(12) United States Patent
Chan et al.

(10) Patent No.: US 8,761,977 B2
(45) Date of Patent: Jun. 24, 2014

(54) METHOD AND APPARATUS FOR OPTIMIZING ENGINE IDLE SPEED IN A VEHICLE

(75) Inventors: Donald Chan, Farmington Hills, MI (US); William L. Aldrich, III, Davisburg, MI (US); John L. Lahti, Novi, MI (US); Birendra P. Bhattarai, Novi, MI (US); Krunal P. Patel, Sterling Heights, MI (US); Ning Jin, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1287 days.

(21) Appl. No.: 12/579,694

(22) Filed: Oct. 15, 2009

(65) Prior Publication Data

US 2011/0088658 A1     Apr. 21, 2011

(51) Int. Cl.
F02D 41/00 (2006.01)

(52) U.S. Cl.
USPC ............... 701/22; 123/339.16; 180/65.25

(58) Field of Classification Search
USPC ............. 701/22; 180/65.25, 65.265; 903/930; 123/339.16
See application file for complete search history.

(56) References Cited

U.S. PATENT DOCUMENTS

| | | | |
|---|---|---|---|
| 6,834,638 B2 * | 12/2004 | Lee | 123/339.11 |
| 7,523,738 B2 | 4/2009 | Ruiz | |
| 2002/0163199 A1 * | 11/2002 | Ramaswamy et al. | 290/40 C |
| 2003/0117113 A1 * | 6/2003 | Takemasa et al. | 320/150 |
| 2004/0030470 A1 * | 2/2004 | De La Salle et al. | 701/22 |
| 2006/0102393 A1 | 5/2006 | Tumback et al. | |
| 2009/0143950 A1 * | 6/2009 | Hasegawa et al. | 701/68 |
| 2009/0205889 A1 * | 8/2009 | Leone | 180/65.265 |
| 2010/0108032 A1 * | 5/2010 | Pursifull et al. | 123/406.12 |
| 2011/0307137 A1 * | 12/2011 | Bryan et al. | 701/22 |

* cited by examiner

Primary Examiner — Marthe Marc-Coleman
(74) Attorney, Agent, or Firm — Quinn Law Group, PLLC

(57) ABSTRACT

A method for optimizing an engine idle speed in a vehicle having an engine, a motor generator unit (MGU), and an energy storage system (ESS) includes determining vehicle operating values, including at least one of: an electrical load of an accessory, a torque capacity of the MGU, a temperature of the MGU, an efficiency of the MGU, and a state of charge (SOC) of the ESS. The method also includes calculating a set of engine speed values using the set of vehicle operating values, and using a controller to command the engine idle speed as a function of the set of engine speed values. A vehicle includes an engine, an ESS, an MGU, and a controller having an algorithm adapted for optimizing an idle speed of the engine as set forth above.

15 Claims, 2 Drawing Sheets

METHOD AND APPARATUS FOR OPTIMIZING ENGINE IDLE SPEED IN A VEHICLE

TECHNICAL FIELD

The present invention relates generally to electrical power flow control aboard a vehicle, and more particularly to a method and a system for optimizing engine idle speed in a vehicle having auto stop/auto start functionality.

BACKGROUND OF THE INVENTION

Certain vehicle designs including hybrid electric vehicles (HEV) can selectively utilize different energy sources to optimize fuel efficiency. For propulsion, an HEV having a full hybrid powertrain can use either or both of an internal combustion engine and a high-voltage (HV) energy storage system (ESS). That is, a typical full HEV can be electrically propelled, usually immediately upon starting the HEV and at relatively low vehicle speeds. One or more HV motor/generator units (MGU) may alternately draw power from and deliver power to the ESS as needed. Upon launch or above a threshold speed, the engine can be restarted using the MGU or a smaller auxiliary starter motor, and then engaged with a transmission to provide the required vehicle propulsive torque to a set of drive wheels.

In contrast to the full hybrid powertrain, a mild hybrid powertrain typically lacks the capability of propelling the vehicle by purely electrical means, but nevertheless retains certain key design features of the full hybrid powertrain, e.g., regenerative braking capability for recharging the ESS using the MGU, as well as the capability of selectively shutting down or powering off the engine at idle. The capability of a HEV to selectively shut off and restart the engine when the vehicle is at a standstill, and/or when operating in a stabilized low-speed drive mode, provides a fuel-saving benefit relative to conventional vehicle designs. However, execution of an auto stop may not be efficient under all circumstances, and therefore under certain operating conditions the engine of an HEV may remain fueled and running at idle.

SUMMARY OF THE INVENTION

Accordingly, a method is provided for optimizing engine idle speed in a vehicle having the engine start/stop functionality noted above. Such a vehicle may be configured as a hybrid electric vehicle (HEV), and may include a high-voltage (HV) motor generator unit (MGU) adapted to assist the automatic starting of the engine after an auto stop event. The method may be embodied in algorithm form, and may be automatically executed via an onboard controller to optimize the engine idle speed when an auto stop event is not commanded.

Execution of the algorithm commands engine idle speeds such that the MGU operates at a speed sufficient to meet onboard vehicle electrical requirements while at the same time optimizing the speed request for thermal and electrical efficiency, noise, vibration, and harshness (NVH) requirements, and engine idle stability. The algorithm utilizes a low idle speed and operating point of the MGU to optimize fuel usage in relation to the electrical load on the MGU.

The algorithm provides a feed-forward mechanism to an idle speed control set point in anticipation of MGU idle load requirements, rather than by reacting to load-induced engine speed fluctuations in the manner of typical alternator-type speed control devices. The MGU temperature is monitored, and engine speed is adjusted if temperature de-rating would result in MGU incapacity to meet idle load requirements. An engine speed is thus targeted that results in optimized system operation based on the electrical efficiency of the MGU.

In particular, a method is provided for optimizing engine idle speed in a vehicle having an engine, an MGU, and an ESS. The method includes determining, e.g., by detecting or referring to recorded or otherwise available data, a set of vehicle electrical values, including at least one of an electrical load on the MGU, e.g., an Auxiliary Power Module (APM) or other HV or auxiliary electrical device, a torque capability or capacity of the MGU, a temperature of the MGU, an efficiency of the MGU, and a state of charge (SOC) of the ESS, and then calculating a set of engine speed values using the set of vehicle electrical values. The method also includes using a controller to command the engine idle speed as a function of the set of engine electrical values. The method may also include separately calculating corresponding values in the set of engine speed values based on the respective temperature of the MGU, the operating efficiency of the MGU, and the electrical load, and then selecting a maximum speed value from the set of engine speed values.

A vehicle is also provided herein that includes an engine, an MGU, and a controller. The controller includes an algorithm for executing the method described above, with the algorithm automatically executed by the controller to optimize the engine idle speed.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
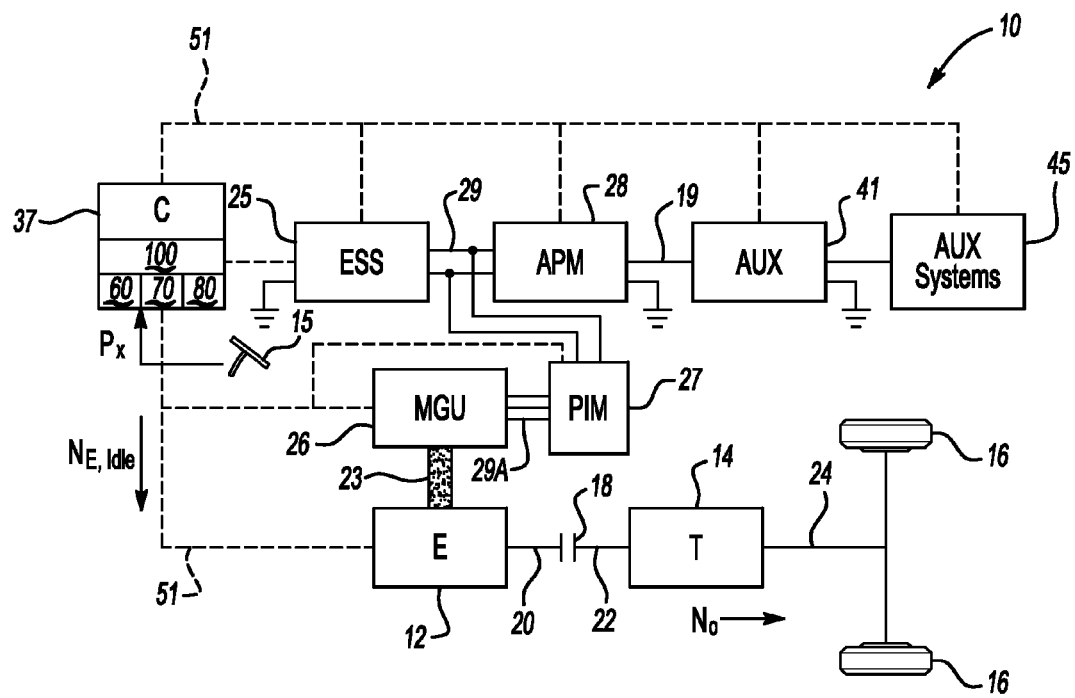
FIG. 1 is a schematic illustration of a vehicle having a controller with an engine idle speed optimization algorithm.

Referring to the drawings, wherein like reference numbers correspond to like or similar components throughout the several figures, FIG. 1 shows a vehicle 10 having an engine (E) 12 with auto stop/auto start functionality as explained above. The vehicle 10, which may be configured as a hybrid electric vehicle (HEV) as shown, includes a controller (C) 37 adapted for executing an auto stop event during vehicle idle or when operating below a threshold speed, and for executing an auto start event when engine propulsion is again required. The controller 37 is also adapted for determining the presence of predetermined operating conditions, and for preventing or delaying execution of the auto stop event under those conditions. When auto stop is prevented in this manner, the engine 12 idles at an engine idle speed ($N_{E,\,idle}$) determined by the controller 37 as set forth below.

The controller 37 is programmed with or has access to an algorithm 100, the execution of which provides a method for optimizing engine idle speed of the vehicle 10, with the algorithm explained in detail below with reference to FIG. 2. The vehicle 10 includes an accelerator pedal 15 having a detectable pedal position (arrow $P_X$), with the pedal position transmitted to and/or read by the controller 37 as an available input signal for determining when to initiate, release, or prevent the auto stop/start event. Controller 37 includes or has access to a set of calibrated lookup tables 60, 70, and 80 as described below with reference to FIG. 2.

The engine 12 includes a crankshaft (not shown) and an output member 20. A transmission (T) 14 of vehicle 10 has an input member 22 and an output member 24. Output member 20 of the engine 12 may be selectively connected to input member 22 via a torque transfer mechanism or clutch device 18. The transmission 14 may be configured as an electrically-variable transmission (EVT) or any other suitable transmission capable of transmitting propulsive torque to a set of road wheels 16 via output member 24. Output member 24 of the transmission 14 rotates at an output speed ($N_O$) in response to a speed request ultimately determined by the controller 37 via pedal 15.

The vehicle 10 may include a high-voltage (HV) electric motor/generator unit (MGU) 26, such as a multi-phase electric machine of approximately 60 volts to approximately 300 volts or more depending on the required design. MGU 26 may be electrically connected to an HV battery or energy storage system (ESS) 25 via an HV direct current (DC) bus 29, a voltage inverter or power inverter module (PIM) 27, and an HV alternating current (AC) bus 29A. The ESS 25 may be selectively recharged using the MGU 26 when the MGU is operating in its capacity as a generator, for example by capturing energy during a regenerative braking event.

During normal operation of the vehicle 10, the MGU 26 may be used to selectively rotate a belt 23 of the engine 12, or another suitable portion thereof, thereby cranking the engine during an auto start event as set forth above. The vehicle 10 may also include an auxiliary power module (APM) 28, e.g., a DC-DC power converter, which is electrically connected to the ESS 25 via the DC bus 29. The APM 28 may also be electrically connected to an auxiliary battery 41, e.g., a 12-volt DC battery, via a low-voltage (LV) bus 19, and adapted for energizing one or more auxiliary systems 45 aboard the vehicle 10.

Still referring to FIG. 1, the controller 37 may be configured as a single control device or a distributed control device that is electrically connected to or otherwise placed in electrical communication with each of the engine 12, the MGU 26, the ESS 25, the APM 28, the PIM 27, and the auxiliary battery 41 via a control channel 51, as illustrated by dashed lines. Control channel 51 may include any required transfer conductors, e.g., a hard-wired or wireless control link(s) or path(s) suitable for transmitting and receiving the necessary electrical control signals for proper power flow control and coordination aboard the vehicle 10. The controller 37 may include such control modules and capabilities as might be necessary to execute all required power flow control functionality aboard the vehicle 10 in the desired manner.

The controller 37 may be configured as a digital computer having a microprocessor or central processing unit, read only memory (ROM), random access memory (RAM), electrically-erasable programmable read only memory (EEPROM), high speed clock, analog to digital (A/D) and digital to analog (D/A) circuitry, and input/output circuitry and devices (I/O), as well as appropriate signal conditioning and buffer circuitry. Any algorithms resident in the controller 37 or accessible thereby, including the engine idle speed optimizing algorithm 100 as described below with reference to FIG. 2, can be stored in ROM and automatically executed by the controller to provide the respective functionality.

As used herein, the term auto stop refers to the ability of the vehicle 10 to selectively shut down or power off the engine 12 whenever the HEV is idle or at a standstill, such as while waiting at an intersection, in low-speed traffic, or when otherwise determined by the control logic resident within the controller 37. In this manner, the vehicle 10 is able to minimize idle fuel consumption. After an auto stop event, the MGU 26 may be used to rapidly restart the engine 12, with this process referred to herein as an auto start event. However, under certain operating conditions the controller 37 may override or temporarily prevent auto stop/auto start cycling, with the engine 12 idling at engine idle speed ($N_{E, idle}$) under such conditions.

The controller 37 executes the algorithm 100 to automatically monitor and adjust the engine idle speed ($N_{E, idle}$) while idling. That is, the controller 37 varies the engine idle speed such that the MGU 26 operates at a motor speed that is sufficient to meet all onboard vehicle electrical load requirements while still optimizing thermal and electrical efficiency, noise, vibration, and harshness (NVH), and idle stability.

Figure 2:
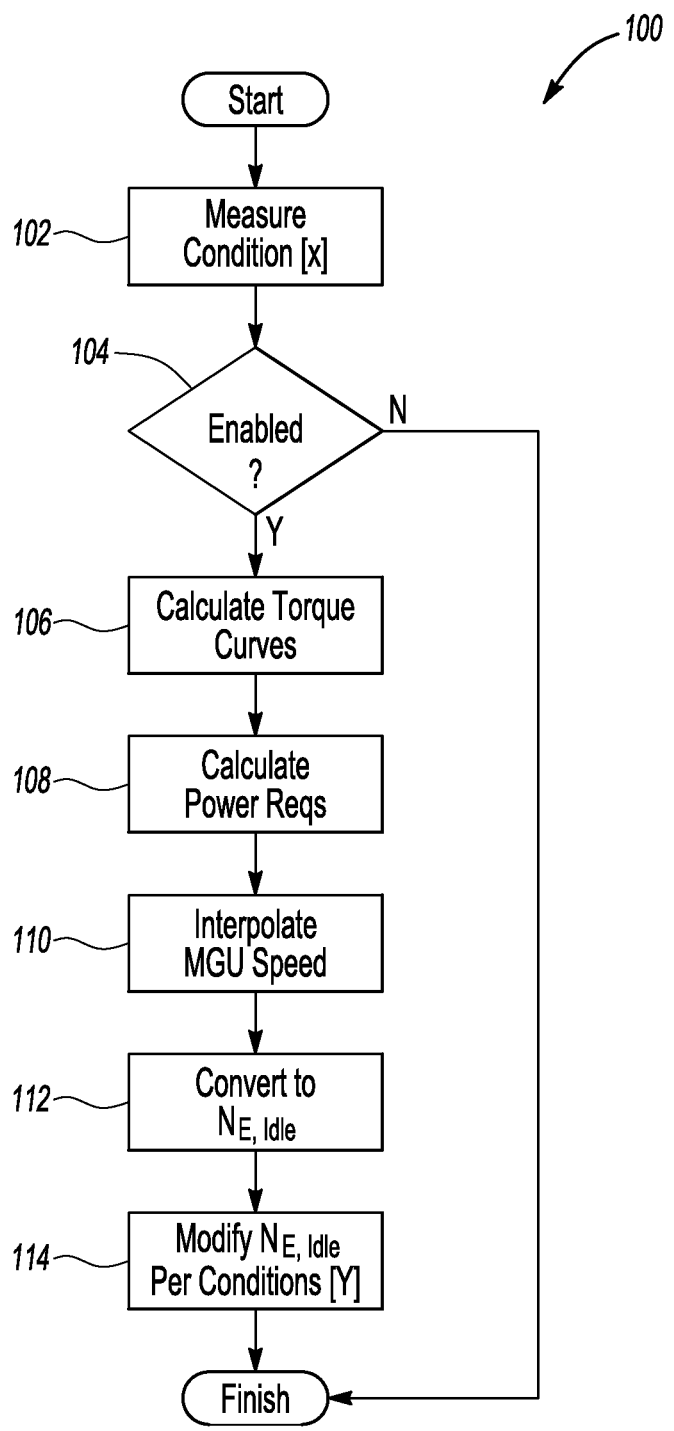
FIG. 2 is a graphical flow chart describing the algorithm usable with the vehicle shown in FIG. 1.

Referring to FIG. 2, execution of the algorithm 100 automatically calculates a minimum desired engine speed ($N_{E, min}$) as a function of electrical load, temperature, and other constraints. For example, a minimum engine speed may be calculated as a function of APM load, ESS charge, MGU temperature, MGU efficiency curves, and/or NVH constraints according to one embodiment. In a typical alternator-type engine idle speed control system, throttle level and spark may be controlled to maintain a desired engine idle speed. However, if the electrical load is high or rapidly changing, conventional throttle level and spark control might be insufficient for holding a steady/constant engine idle speed.

Consequently, to maintain constant power the torque from the MGU must increase as engine speed decreases. Conventional control systems may have difficulty maintaining engine idle speed during transient conditions when engine speed rapidly decreases. Execution of algorithm 100 therefore monitors MGU electrical loads, e.g., loads of the APM 28 and charging requirements of the ESS 25 of FIG. 1, and requests an appropriate engine idle speed ($N_{E, idle}$) prior to entering the idle state.

The algorithm 100 begins with step 102, wherein a set of conditions (X) are measured and verified to enable engine idle speed optimization logic. For example, conditions (X) may include the state of charge (SOC) for the ESS 25, the current engine speed, torque capability or capacity of the MGU 26, electrical load of the APM 28, etc. Once measured and temporarily recorded in memory, the algorithm 100 proceeds to step 104.

At step 104, the algorithm 100 compares the measured values from step 102 to corresponding threshold values. Based on the results of this comparison, the algorithm either proceeds to step 106 if the measured values exceed their corresponding thresholds, or exits if they do not.

Figure 3:
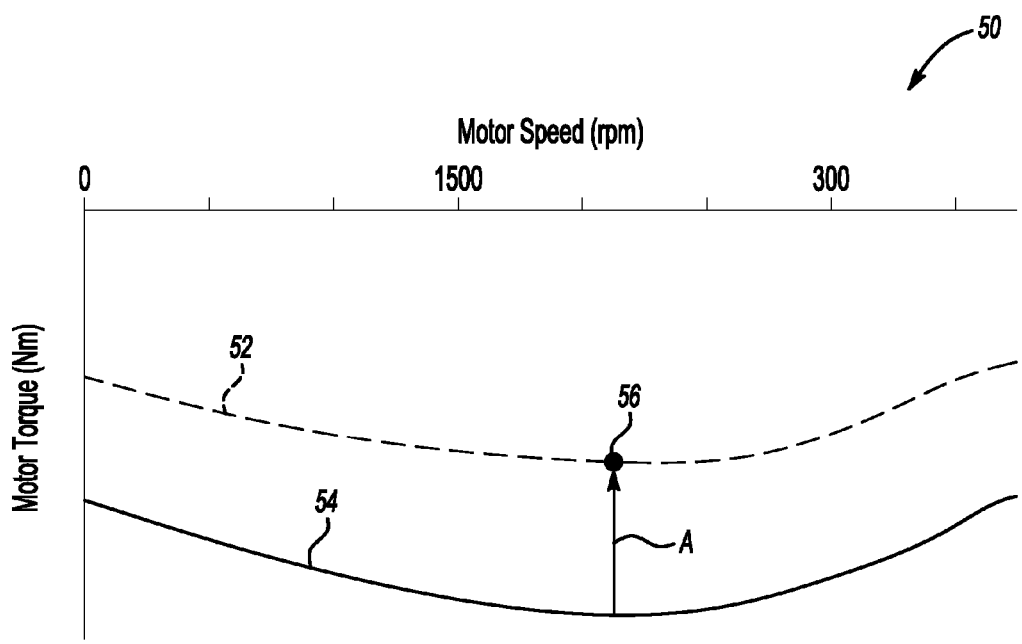
FIG. 3 is a set of torque curves for the vehicle shown in FIG. 1.

At step 106, a revised torque capability curve is calculated. Referring briefly to FIG. 3, step 106 may include calculating adjusting or modifying a pre-calculated or calibrated motor optimum capability curve 54 in the direction of arrow A. The revised torque capability curve 52 may be calculated based on the motor optimum capability curve 54, current motor speed, i.e., a measured rotational speed of the MGU 26, and the motor torque capacity (point 56). Point 56 represents the motor torque capacity of MGU 26 at the current engine speed, with the value of point 56 being reduced from this level if the MGU 26 de-rating is active due to thermal considerations or a calibrated reserve value. That is, curve 52 and point 56 may be set equal to a calibrated minimum value if the curve 52 does not provide at least an allowable minimum amount of torque for the present operating conditions. The algorithm 100 then proceeds to step 108.

Referring again to FIG. 3, at step 108 the algorithm 100 calculates power requirements from the engine 12. Step 108 may entail using calibrated "donut space" coefficients and the revised torque capability curve 52 of FIG. 3 using the formula:

$$p = (A1 * T_{MGU} + A2)^2 + Ca.$$

As used herein, the term donut space coefficients refers to system constraints used in the optimization algorithm 100, wherein the power from the MGU 26 and APM 28 of FIG. 1 are modeled as a second order polynomial equation with motor torque ($T_{MGU}$) used as the independent variable. The model coefficients A1, A2, and Ca are a function of motor speed ($N_{MGU}$), and are tabulated for various motor speeds and stored in a lookup table or other location or format that is readily accessible by the controller 37. The algorithm 100 then stores the calculated value in memory and proceeds to step 110.

At step 110, the algorithm 100 compares the calculated power (p) from step 108 and the APM electrical load for each motor speed, and then interpolates the motor speed based on power (p). The interpolated motor speed is recorded in memory, and the algorithm 100 proceeds to step 112.

At step 112, the motor speed is converted into engine idle speed ($N_{E, idle}$), for example using a calibrated or recorded pulley ratio. The algorithm 100 then proceeds to step 114.

At step 114, the value of the engine idle speed ($N_{E, idle}$) from step 112 is modified based on a set of conditions (Y). Within the scope of the present invention, there are at least three possible conditions (Y) that may warrant an increase in engine idle speed: (a) APM electrical load and state of charge (SOC) of the ESS 25 of FIG. 1; (b) temperature of the MGU 26; and (c) efficiency of MGU 26.

In one embodiment, first lookup table 60 may be populated and stored in memory of the controller 37, indexed by motor temperature and corresponding multipliers, with a selected multiplier being applied to the value of the engine idle speed ($N_{E, idle}$) calculated at step 112. Second lookup table 70 may be provided indexed by electrical loads of the APM 28 and/or SOC of the ESS 25 and corresponding multipliers, with a selected multiplier being applied to the value of the engine idle speed ($N_{E, idle}$) calculated at step 112. Motor efficiency may also be calculated and used as an index in third lookup table 80. As used herein, motor efficiency refers to the calculated value of electrical input power/mechanical output power to the MGU 26.

The modification at step 114 may utilize any or all of the calculated speeds noted above. In one embodiment, the algorithm 100 can select a maximum of the three speeds determined using lookup tables 60, 70, and 80. The selected maximum value may be grade and magnitude-limited as needed, e.g., using calibrated thresholds. Other embodiments are also possible without departing from the intended scope of the invention, e.g., a standard or a weighted average of the three speeds, etc.

As will be understood by those of ordinary skill in the art, execution of algorithm 100 may optimize idle fuel consumption relative to MGU load, while enhancing idle stability by anticipating high MGU loads and requesting an idle boost prior to entering the idle state. Algorithm 100 may also compensate for and reduce MGU overheating, ensuring that operation point of the MGU at idle is sufficient to meet vehicle load requirements under all conditions. Idle vibration may be reduced by optimizing the commanded engine idle speed to match the MGU requirements.

While the best modes for carrying out the invention have been described in detail, those familiar with the art to which this invention relates will recognize various alternative designs and embodiments for practicing the invention within the scope of the appended claims.

The invention claimed is:

1. A method for optimizing an engine idle speed in a vehicle having an engine, a motor generator unit (MGU), and an energy storage system (ESS), the method comprising:
   determining a set of vehicle electrical values, including at least one of: an electrical load on the MGU, a temperature of the MGU, an efficiency of the MGU, and a state of charge (SOC) of the ESS;
   measuring a speed of the MGU;
   calculating a torque capacity curve for the MGU using the measured speed of the MGU;
   selecting a maximum of the calculated torque capacity curve and a calibrated torque capacity curve;
   calculating a set of engine speed values using the set of vehicle operating values; and
   using a controller to command the engine idle speed as a function of the set of engine speed values, including controlling the MGU via the selected maximum of the calculated torque capacity curve and a calibrated torque capacity curve.

2. The method of claim 1, wherein the set of vehicle electrical values includes each of: the electrical load on the MGU, the temperature of the MGU, the efficiency of the MGU, and the SOC of the ESS.

3. The method of claim 1, further comprising:
   separately calculating corresponding values in the set of engine speed values based on the respective temperature of the MGU, operating efficiency of the MGU, and electrical load on the MGU; and
   selecting a maximum speed value from the set of engine speed values.

4. The method of claim 1, wherein using a controller to command the engine idle speed includes: automatically accessing a lookup table using the controller to select a multiplier, and then applying the multiplier to a corresponding value of the set of engine speed values.

5. The method of claim 1, further comprising:
   using the controller to model a calculated power output of each of the MGU and an auxiliary power module (APM) as a second order polynomial to thereby calculate an electrical power requirement of the MGU.

6. The method of claim 5, further comprising:
   interpolating a motor speed using the calculated power output; and
   converting the motor speed into the engine idle speed.

7. A method for optimizing an engine idle speed in a vehicle having an engine, a motor generator unit (MGU), and an energy storage system (ESS), the method comprising:
   determining a set of vehicle electrical values, including: an electrical load on the MGU, a torque capacity of the MGU, a temperature of the MGU, a charging efficiency of the MGU, and a state of charge (SOC) of the ESS;
   calculating a set of engine speed values using the set of vehicle electrical values, including using a calibrated pulley ratio to convert motor speed values of the MGU into the set of engine speed values; and
   using a controller to set the engine idle speed to a maximum speed value selected by the controller from the set of engine speed values.

8. The method of claim 7, further comprising:
   separately calculating a corresponding engine speed value based on a respective one of the temperature of the MGU, the operating efficiency of the MGU, and the electrical load on the MGU;

selecting a maximum speed value from the corresponding engine speeds; and commanding the engine idle speed as a function of the maximum speed value.

9. The method of claim 7, further comprising:

measuring a speed of the MGU;

calculating a torque capacity curve for the MGU using the speed of the MGU;

comparing the torque capacity curve to a calibrated torque capacity curve to determine a maximum torque value; and using the maximum torque value to calculate the set of engine speed values.

10. The method of claim 7, further comprising:

using the controller to model a calculated power output of the MGU and of an auxiliary power module (APM) connected to the MGU as a second order polynomial to thereby calculate an electrical power output requirement of the MGU.

11. A vehicle comprising:

an engine;

an energy storage system (ESS);

a motor generator unit (MGU); and a controller configured to optimize an idle speed of the engine;

wherein the controller is further configured to execute an algorithm is adapted for to thereby cause the controller to:

determine a set of vehicle electrical values, including at least one of: an electrical load on the MGU, a temperature of the MGU, an efficiency of the MGU, and a state of charge (SOC) of the ESS;

measure a speed of the MGU;

calculate a torque capacity curve of the MGU using the measured speed of the MGU;

select a maximum of the calculated torque capacity curve and a calibrated torque capacity curve;

calculate a set of engine speed values using the set of vehicle electrical values; and command the engine idle speed via control of the MGU as a function of the set of engine speed values and the selected maximum of the calculated torque capacity curve and a calibrated torque capacity curve.

12. The vehicle of claim 11, wherein the set of vehicle electrical values includes each of: the electrical load on the MGU, the torque capacity of the MGU, the temperature of the MGU, the efficiency of the MGU, and the SOC of the ESS.

13. The vehicle of claim 11, wherein the controller is configured to:

separately calculate corresponding values in the set of engine speed values based on the respective temperature of the MGU, the operating efficiency of the MGU, and the electrical load on the MGU; and select a maximum speed value from the set of engine speed values.

14. The vehicle of claim 11, wherein the controller commands the engine idle speed by: automatically accessing a lookup table using the controller to select a multiplier, and then applying the multiplier to a corresponding value of the set of engine speed values.

15. The vehicle of claim 11, wherein the controller is adapted for modeling a calculated power output of each of the MGU and an auxiliary power module (APM) as a second order polynomial to thereby calculate an electrical power requirement of the MGU, for interpolating a motor speed using the calculated power output, and for converting the motor speed into the engine idle speed.

* * * * *